July 23, 1968  C. SOLOMONS  3,394,069
ELECTROCHEMICAL GAS SENSOR
Filed April 17, 1964

INVENTOR.
CYRIL SOLOMONS
BY Robert O. Vidas
ATTORNEY

3,394,069
ELECTROCHEMICAL GAS SENSOR
Cyril Solomons, Edina, Minn., assignor to Honeywell Inc., a corporation of Delaware
Filed Apr. 17, 1964, Ser. No. 360,690
9 Claims. (Cl. 204—195)

ABSTRACT OF THE DISCLOSURE

An improved dissolved oxygen sensor having a relatively thick diffusion medium composed of an unwettable material with capillary-sized openings for the diffusion of oxygen into the sensor.

---

This invention is generally related to measuring instruments of the electrochemical type which can be used to determine the concentration of a gas dissolved in a liquid or another gas. More particularly, this invention is directed to an improved diffusion medium for use in electrochemical devices of this type.

Although this invention is illustrated in conjunction with the polarographic determination of oxygen concentrations, it is to be understood that the invention is not limited thereto as it is readily applicable to measurement of other, less common, reducible or oxidizable gases and to other techniques such as galvanic techniques which may be utilized with the same general device structure. These matters will be obvious to those skilled in the art.

The diffusion medium most utilized in the prior art dissolved oxygen sensors has been a thin membrane of a material such as polyethylene or rubber. The thickness of such membranes has ranged from about 0.0005 to about 0.005 inch. These prior art diffusion membranes have been satisfactory to a degree. However, the delicate nature of such thin membranes has been found to be a handicap due to the ease with which they can be accidentally penetrated by foreign objects thus resulting in undesirable leakage into the interior of the device. Furthermore, these membranes are flexible and susceptible to cold flow. In consequence, changes in membrane tension occur which have been found to affect the stability of the cell response and also give rise to undesirable background noises. Also, the tension of the membrane must be adjusted to relatively narrow limits. If the tension is too high, the path into the cell is "pinched off"; if the tension is too low, the membrane tends to flex causing undesirable electrical noise.

It is an object of this invention, therefore, to provide a diffusion medium for use in polarographic type sensors such as dissolved oxygen sensors which is less subject to accidental penetration than the diffusion membranes of the prior art.

Another object of this invention is to provide a diffusion medium which is relatively inflexible thus providing stable response of the sensor.

Another object of this invention is to provide a diffusion medium for use in polarographic sensors which is easier to assemble into the unit and more readily retained therein than the flexible membranes of the prior art.

A still further object of this invention is to provide a diffusion medium, the characteristics of which are easily reproducible in manufacture.

It is still another object of this invention to provide a wider choice of materials for use as diffusion media in polarographic sensors than has been available heretofore in the prior art.

It is also an object of this invention to provide a porous diffusion medium for use in polarographic sensors as opposed to the non-porous membranes of the prior art.

These and other objects and advantages of this invention will become more readily understood from the accompanying specification and drawings in which.

It will be seen that, in accordance with the objects of this invention, there is provided a strong, stable and easily assembled diffusion medium for use in measuring the concentration of dissolved gases such as oxygen in aqueous and other solutions and in gaseous media.

Figure 1:
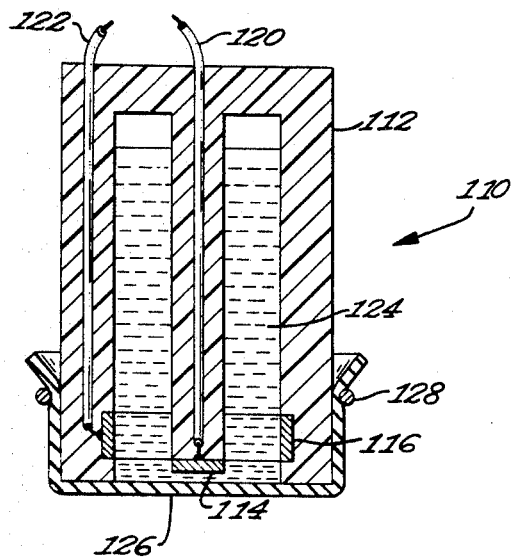
FIGURE 1 is a schematic cross sectional representation of a prior art dissolved oxygen sensor.
Figure 2:
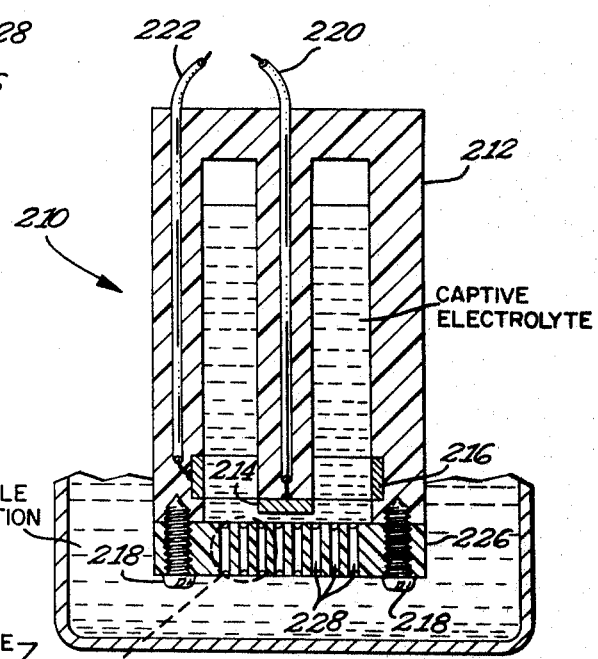
FIGURE 2 is a schematic cross sectional representation of a dissolved oxygen sensor utilizing the diffusion medium provided by the present invention.

The basic structure of dissolved oxygen sensors typical of the prior art and that of the present invention is shown in FIGURES 1 and 2. The sensor comprises an electrolytic cell consisting of a pair of spaced electrodes mounted in a hollow, cylindrical body. The body contains a captive electrolytic solution to which the electrodes are exposed. An opening in the body in the vicinity of the electrodes is closed by a diffusion medium. The electrodes are interconnected through electrical leads by an appropriate external circuit, several types of which are well known in the art.

In operation, the sample fluid, whose oxygen content is to be measured is brought into contact with the diffusion medium. Dissolved oxygen from the sample diffuses through the medium and into the captive electrolyte. The oxygen then undergoes reduction at one of the electrodes. This results in a change in the electrical characteristics of the captive electrolyte which may be detected by the external circuit as a current change. The magnitude of this current is proportional to the oxygen concentration in the sample solution.

Referring now to FIGURE 1, there is shown a dissolved oxygen sensor 110 in accordance with the prior art consisting of a cylindrical hollow body 112 made of an insulating material such as a plastic epoxy or the like. Mounted in body 112 is a platinum electrode 114 surrounded by a ring shaped reference electrode 116 made of silver. Electrical leads 120 and 122 contacting electrodes 114 and 116 respectively communicate with the exterior of body 112 for contacting an external circuit.

The captive electrolyte, such as an aqueous solution of potassium chloride, is contained in cavity 124 of body 112. Many alternative electrolyte compositions and the concentrations thereof are well known in the art.

Closing the end of body 112 and closely associated with the spaced electrodes 114 and 116 is the diffusion medium, which in this case is a thin, non-porous membrane 126 of rubber, polyethylene or the like stretched over the lower end of body 112. An elastic O-ring 128 is shown holding membrane 126 on body 112.

In the flexible membranes utilized in these prior art devices, the diffusion mechanism of the dissolved gas from the sample fluid, through the membrane and into the captive electrolyte is as follows:

Oxygen in the sample solution dissolves into the membrane material, whether it is polyethylene, Teflon, natural rubber or the like. The oxygen concentration differential across the membrane causes the oxygen to be transferred into the captive electrolyte by diffusion of this dissolved gas through the membrane. Upon arrival at the sensor cathode in the captive electrolyte the oxygen is reduced to form hydroxyl ions, thus maintaining the oxygen concentration gradient across the membrane. However, this type of thin membrane suffers certain disadvantages as heretofore noted since it must be flexible and quite thin in order to function properly.

Figure 2A:
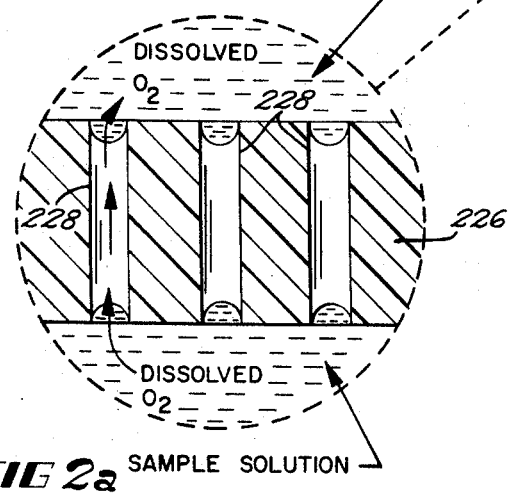
FIGURE 2A is an enlarged fragmentary view taken as indicated in FIGURE 2.

Referring now to FIGURE 2, there is shown a dissolved oxygen sensor 210 in accordance with this invention. The basic device is similar to the sensors of the prior art having the same essential components which are numbered similarly to those in FIGURE 1. However, a new and improved diffusion medium 226 having a plurality of pores 228 therein is employed in place of the flexible, non-porous membrane 126 of FIGURE 1. FIGURE 2A schematically shows a portion of the diffusion medium 226 in detail to illustrate the diffusion mechanism existing therein.

As is well known, the rise of liquids in capillary tubes is dependent on the interfacial tension of the liquid and solid surfaces concerned. Some liquids, like water, wet the walls of a glass capillary tube; others, like mercury do not. When a liquid wets the tube, the liquid adhering to the walls pulls the body of the liquid up; but when the liquid does not adhere, the liquid is depressed. The diffusion medium 226 in accordance with the present invention makes use of the second aspect of this phenomenon. The material of which medium 226 is composed is non-wettable with respect to the solutions contacting it (sample solution and captive electrolyte) thus for aqueous solutions non-wettable materials would be used. As a consequence, pores 228 in diffusion medium 226 tend to resist the entrance of either liquid when exposed thereto. However, due to hydrostatic pressures external to the membrane, the liquids may be forced into the pores to a limited extent as shown schematically in FIGURE 2A. Entrapped between the liquids is a gaseous atmosphere in the form of a bubble. Thus a path is established through this bubble between the sample solution and the captive electrolyte for the diffusion of dissolved oxygen into the working area of the sensor, while the presence of the bubble and the non-wettable nature of the pores prevent the establishment of a corresponding path for the fluids.

As stated above, the material of which the diffusion medium 226 is formed must be non-wettable by the liquids it is in contact with and contain a plurality of pores. These pores are capillary in size and may be either naturally occurring or purposely formed therein. In addition, certain materials which are not non-wettable inherently may be treated with substances to render exposed surfaces non-wettable. Thus in the case of aqueous electrolytes and sample solutions, the materials should be non-wettable or be coated on their exposed surfaces with non-wettable materials such as polyethylenes, polytetrafluoroethylenes, or materials of the classes known as paraffin waxes, silicones, etc.

An example of an inherently non-wettable material is Teflon (PTFE) which is suitable for use in accordance with this invention in sheet form rather than the thin film form used heretofore. Such sheets have been found to function satisfactorily as a diffusion medium when having holes drilled therein of approximately 0.013 inch in diameter. Of course, the specific pore size is to be determined by the surface tensions of the solutions involved in any particular application. Other materials of this type which may be used to obtain the advantages of this invention are polyethylene and Kel-F. These materials are distinguished over their prior art use in that they are porous by means of capillary sized holes formed therein, thicker than film or membrane size ranges, and relatively rigid.

Naturally porous materials such as porous PTFE, sintered ceramics and sintered glass frit are also satisfactory for use in accordance with this invention. However, in the case of sintered ceramics, glass frit and the like, the material must be rendered non-wettable. Siliconizing, by means of non-wettable silicones which are well known in the art, has been found to render such materials non-wettable by the solutions to which they are exposed. Other coatings may be utilized to render such porous media non-wettable. For example, Teflon (PTFE) coated glass fiber cloth is satisfactory for use as a diffusion medium in accordance with this invention.

Thus, it is seen that this invention provides a new and improved rigid diffusion medium for use in combination with dissolved gas sensors of the prior art which result in a more rugged device capable of more stable electrical outputs than heretofore available. Furthermore, it makes possible devices of much simpler construction than has been heretofore available. For example, the entire body of the device can be made of a non-wettable material such as Teflon or the like with the capillary pores being formed directly therein thus eliminating the need for a separate diffusion medium and the additional mounting requirements therefor. It can be seen that an integrated structure is thereby provided which is more rugged and more easily manufactured than heretofore.

Many other modifications and variations of the present invention are possible in the light of the above teachings. It is, therefore, to be understood that within the scope of the appended claims, the invention may be practiced otherwise than as specifically described.

I claim:

1. An electrochemical cell for measuring the concentration of a dissolved gas in a solution comprising: a pair of spaced electrodes, an electrically insulating and chemically inert body of a non-wettable material supporting said pair of spaced electrodes, and a liquid electrolyte bridging said electrodes, said body being further characterized in that a portion thereof contains a plurality of capillary sized pores adapted to extend between said solution and said electrolyte, said portion exceeding 0.005 inch in thickness.

2. In an electrochemical cell for measuring the concentration of a dissolved gas in a solution, said cell including a pair of spaced electrodes, a liquid electrolyte solution bridging said electrodes and an electrically insulating and chemically inert means supporting said electrodes, the improvement comprising: a non-wettable diffusion medium exceeding 0.005 inch in thickness containing a plurality of capillary size pores, said medium being supported by said inert means and separating said electrodes and said electrolyte from said solution.

3. The electrochemical cell of claim 2 in which said diffusion medium is of a material with at least the walls of said pores being non-wettable by means of a coating thereon.

4. The cell of claim 3 in which said non-wettable coating is a paraffin wax.

5. The cell of claim 3 in which said material is a sintered glass frit and said non-wettable coating is a silicone.

6. The cell of claim 3 in which said medium is a glass-fiber cloth and said coating is polytetrafluoroethylene.

7. The cell of claim 2 in which said medium is polytetrafluoroethylene.

8. The cell of claim 2 in which said capillary-sized pores are about 0.013 inch in diameter.

9. The cell of claim 8 in which said diffusion medium is polytetrafluoroethylene.

References Cited

UNITED STATES PATENTS

| | | | |
|---|---|---|---|
| 2,947,797 | 8/1960 | Justi et al. | 136—86 |
| 3,001,918 | 9/1961 | Czuha | 204—195 |
| 3,007,840 | 11/1961 | Wilcox | 260—2.5 |
| 3,098,813 | 7/1963 | Beebe et al. | 204—195 |
| 3,116,355 | 12/1963 | Oswin | 204—295 |
| 3,125,418 | 3/1964 | Thompson et al. | 136—86 |
| 3,128,262 | 4/1964 | Lightfoot | 260—2.5 |
| 3,140,266 | 9/1964 | Peticolas | 260—2.5 |
| 3,216,882 | 11/1965 | Feldt et al. | 260—2.5 |
| 3,223,597 | 12/1965 | Hersch | 204—1.1 |

HOWARD S. WILLIAMS, *Primary Examiner.*

T. TUNG, *Assistant Examiner.*